(12) United States Patent
Tanaka et al.

(10) Patent No.: US 7,199,830 B1
(45) Date of Patent: Apr. 3, 2007

(54) IMAGE PICKUP APPARATUS INCLUDING SELECTIVE INSERTION OF ND FILTER INTO TAKING LENS OPTICAL PATH BASED ON LUMINANCE OF OBJECT TO BE IMAGED

(75) Inventors: Toshiyuki Tanaka, Nishinomiya (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/437,497

(22) Filed: Nov. 10, 1999

(30) Foreign Application Priority Data

Nov. 11, 1998 (JP) ................................. 10-320444

(51) Int. Cl.
*H04N 5/232* (2006.01)
(52) U.S. Cl. ..................................... 348/362
(58) Field of Classification Search ............. 348/223.1, 348/224.1, 225.1, 229.1, 234, 363, 362, 235, 348/236; 359/227, 888, 889
See application file for complete search history.

(56) References Cited

U.S. PATENT DOCUMENTS 4,489,345 A * 12/1984 Itani et al. ............... 348/223.1
4,567,509 A * 1/1986 Takayama et al. ........ 348/224.1
5,432,578 A * 7/1995 Suzuki ....................... 396/281
5,483,280 A * 1/1996 Takahashi et al. .......... 348/363
5,530,474 A * 6/1996 Takei ....................... 348/224.1
6,529,212 B2 * 3/2003 Miller et al. ................ 348/690

FOREIGN PATENT DOCUMENTS

| JP | 02-042426 | 2/1990 |
|---|---|---|
| JP | 06-054253 | 2/1994 |
| JP | 10210487 | 7/1998 |

* cited by examiner

*Primary Examiner*—Vivek Srivastava
*Assistant Examiner*—James M. Hannett
(74) *Attorney, Agent, or Firm*—McDermott Will & Emery LLP

(57) ABSTRACT

In a digital camera using an ND filter to be inserted into an optical path of an optical lens system, defocus quantity of the taking lens and imbalance of white balance due to the insertion of the ND filter are previously calculated or measured. The ND filter is inserted into the optical path when user fully pushes down a shutter release switch for taking an image of an object in order to shorten supply of electric power to an actuator for driving the ND filter. The position of the taking lens is compensated just before an image pickup device is driven for taking the image. The white balance of the image signals from the image pickup device is compensated by using the previously measured compensation coefficients.

11 Claims, 6 Drawing Sheets

IMAGE PICKUP APPARATUS INCLUDING SELECTIVE INSERTION OF ND FILTER INTO TAKING LENS OPTICAL PATH BASED ON LUMINANCE OF OBJECT TO BE IMAGED

This application is based on patent application Hei. 10-320444 filed in Japan, the content of which are hereby incorporated by references.

BACKGROUND OF THE INVENTION

1. Field of the Invention

This invention relates to an image pickup apparatus using an image pickup device such as CCD (Charge Coupled Device), and especially relates to a light quantity control system for exposing the image pickup device.

2. Description of the Related Art

This type of image pickup apparatus is described below by taking a digital camera as an example.

In recent years, a density of pixels of the CCD becomes higher, so that a ½ inch sized CCD with 1.5 million pixels is realized. In a conventional digital camera at initial stage, a diameter of an aperture of an optical system is mechanically controlled for adjusting a quantity of exposing light similar to a conventional camera system using a silver-salt film. Alternatively, a time period for storing electric charge (hereinafter abbreviated as charge storage time) in each pixel of the CCD is controlled for adjusting a quantity of exposing light under a fixed diameter of the aperture of the optical system.

A relation between the optical system and the diameter of the aperture thereof in the digital camera with the ½ inch sized CCD (hereinafter abbreviated as digital camera) is compared with another relation between them in a conventionally popularized camera using a 135 size silver-salt film (hereinafter abbreviated as 135 size camera).

A frame size of the 135 size camera is 24 mm×36 mm, so that a length of a diagonal of the frame is about 43 mm. With respect to the frame size, a focal length of a standard lens of the 135 size camera is, for example, 50 mm. When this relation is applied to the digital camera, since a length of a diagonal of the frame of the digital camera is ½ inch (about 13 mm), a focal length of a standard lens becomes about 15 mm. An aperture number (F number) of the lens is a result that the focal length is divided by the diameter of an aperture diaphragm. When the aperture number is F16 in the digital camera, the diameter of the aperture diaphragm becomes smaller than 1 mm. It is substantially pinhole. The shorter the focal length of the lens becomes, the smaller the diameter of the aperture diaphragm becomes.

When the diameter of the aperture diaphragm of the lens becomes smaller, it is difficult mechanically to control the diameter of the aperture diaphragm accurately. Furthermore, quality of an image is deteriorated by diffraction. Especially, in the digital camera with a high pixel-density CCD, the size of each pixel becomes much smaller, so that the deterioration of the quality of the image due to the diffraction cannot be disregarded.

In order to control the aperture number not to be larger than a predetermined value, in other words, to control the diameter of the aperture diaphragm not to be smaller than a predetermined value, it is proposed to use an ND (Neutral Density) filter which is an optical light quantity control device is used together with the aperture diaphragm which is a mechanical light quantity control device. For example, a publication gazette of Japanese Patent Application Hei 10-210487 shows a conventional digital camera with an ND filter inserted into an optical path of an image pickup optical system by movement of a plunger when a luminance of an object is higher than a predetermined value. In the conventional digital camera, a white filter is further inserted into the optical path by the plunger for adjusting white balance of an image automatically. When an image data of the white filter is taken, output levels of signals with respect to R (Red), G (Green) and B (Blue) are balanced by using the image data.

The digital camera is generally driven by an energy from a battery. The CCD and an LCD (Liquid Crystal Display) used in the digital camera, however, consume a lot of electric energy. Thus, the digital camera conventionally has a problem that the energy of the battery is consumed fast. In the above-mentioned conventional digital camera shown in the publication gazette Hei 10-210487, the ND filter is automatically inserted into the optical path by the movement of the plunger when the luminance of the object is higher than the predetermined value, even though the digital camera is in a waiting state of the image pickup operation. The electric energy of the battery is largely consumed by not only the CCD and the LCD, but also the plunger. The life of the battery becomes much shorter.

On the other hand, the ND filter is an optical parallel, so that the optical path length is changed when the ND filter is inserted into the optical path, and the position of the image (or focal plane) moves backward. Thus, when the focusing of the taking lens is completed before the ND filter is inserted into the optical path, the image on the CCD is defocused due to insertion of the ND filter. In the digital camera at initial stage with the CCD having three hundred thousand pixels, the density of the pixels of the CCD is relatively smaller and the resolution of the image is lower. Thus, the defocus of the image due to the insertion of the ND filter can be disregarded. However, when the number of the pixels of the CCD becomes larger than one million, the resolution of the image becomes much higher, so that the defocus of the image due to the insertion of the ND filter cannot be disregarded. This phenomenon of the defocus becomes noticeable when a focal length of a zoom lens is changed to be longer.

The ND filter primarily cuts the quantity of light evenly by the same ratio with no relation to the wavelength of the light. Such an ideal ND filter, however, is impossible to produce. An actual ND filter has variation of the spectral transmittance as shown in FIG. 8. In the example of the ND filter shown in FIG. 8, the transmittance of red is higher, so that the light passing through the ND filter is tinged with red. When the white balance is adjusted before the insertion of the ND filter, the levels of the signals of R, G and B from the CCD becomes imbalance due to the insertion of the ND filter.

There is no problem of the above-mentioned defocus of the image or the imbalance of the white balance due to the insertion of the ND filter, when the ND filter is inserted into the optical path just before the image pickup operation, and the taking lens is focused and the white balance is adjusted after the insertion of the ND filter. However, when the ND filter and the white filter are inserted into the optical path by the movement of the plunger, a time period for supplying the electric energy to the plunger becomes longer and the battery is consumed fast. Furthermore, a time lag from pushing on of a shutter release switch to an actual image pickup by the CCD becomes much longer. User misses a chance for taking a good picture image.

SUMMARY OF THE INVENTION

A purpose of the present invention is to provide an improved image pickup apparatus automatically inserting an ND filter in an optical path when a luminance of an object is higher than a predetermined value in which defocus of an image and imbalance of white balance due to the insertion of the ND filter are prevented, consumption of a battery is reduced and a time lag from shutter release operation to start of image pickup operation is shortened.

An image pickup apparatus in accordance with the present invention comprises an image pickup optical lens system, an image pickup device, a sensor for sensing a luminance of an object, a judging device for judging whether the luminance of the object is larger than a predetermined or not, an ND filter, a driver for inserting the ND filter into an optical path of the image pickup optical lens system when the luminance of the object is larger than the predetermined value, and a compensator for compensating output signals from the image pickup device when the ND filter is inserted into the optical path.

By such a configuration, the ND filter is inserted into the optical path after standing by the image pickup operation, so that a time period for supplying electric energy to the driver becomes shorter. Thus, consumption of a battery can be minimized. Furthermore, the output signals from the image pickup device is compensated when the ND filter is inserted into the optical path, problems due to the insertion of the ND filter such as imbalance of the white balance can be disregarded. Still furthermore, the already adjusted levels of the output signals from the image pickup device are compensated when the ND filter is inserted into the optical path, so that a time lag from shutter release operation to the actual image pickup operation can be shortened.

DETAILED DESCRIPTION OF THE EMBODIMENT

An embodiment of an image pickup apparatus in accordance with the present invention is described. In the description of the embodiment, "right" and "left" are standardized by a user peeping a viewfinder of the digital camera.

Figure 1:
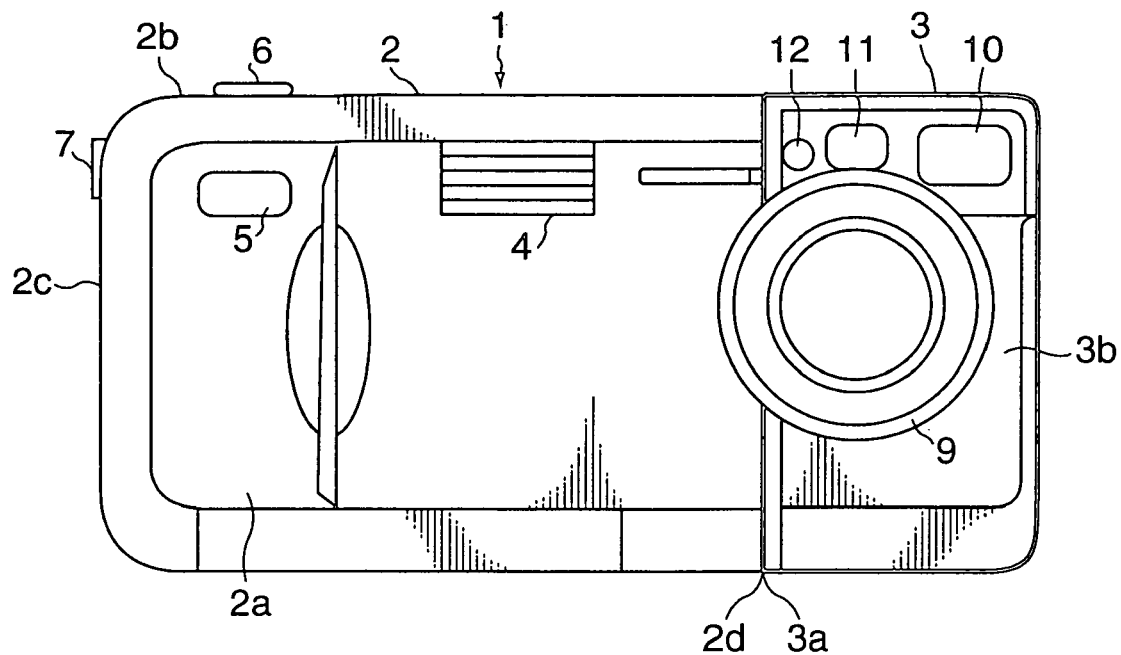
FIG. 1 is a front view for showing an appearance of a digital camera which is an embodiment of an image pickup apparatus in accordance with the present invention.
Figure 2:
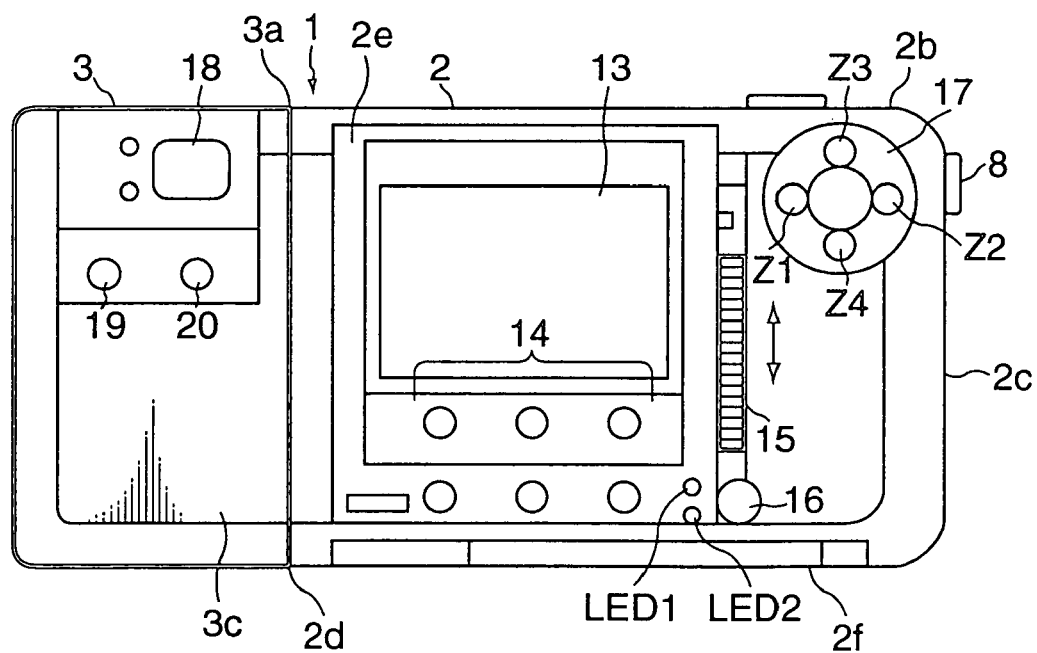
FIG. 2 is a rear view of the digital camera.
Figure 3:
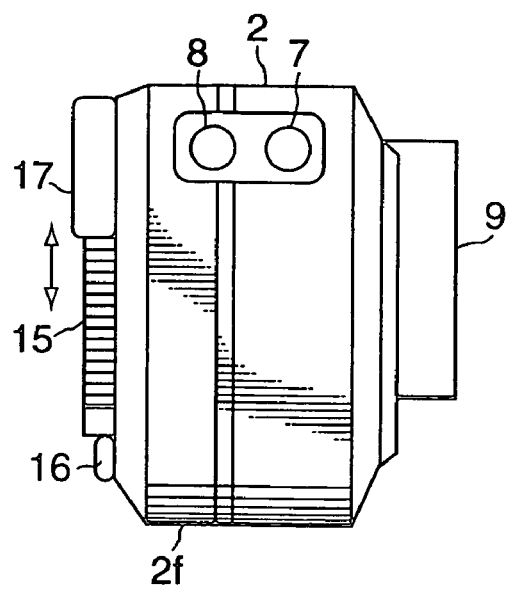
FIG. 3 is a right side view of the digital camera.
Figure 4:
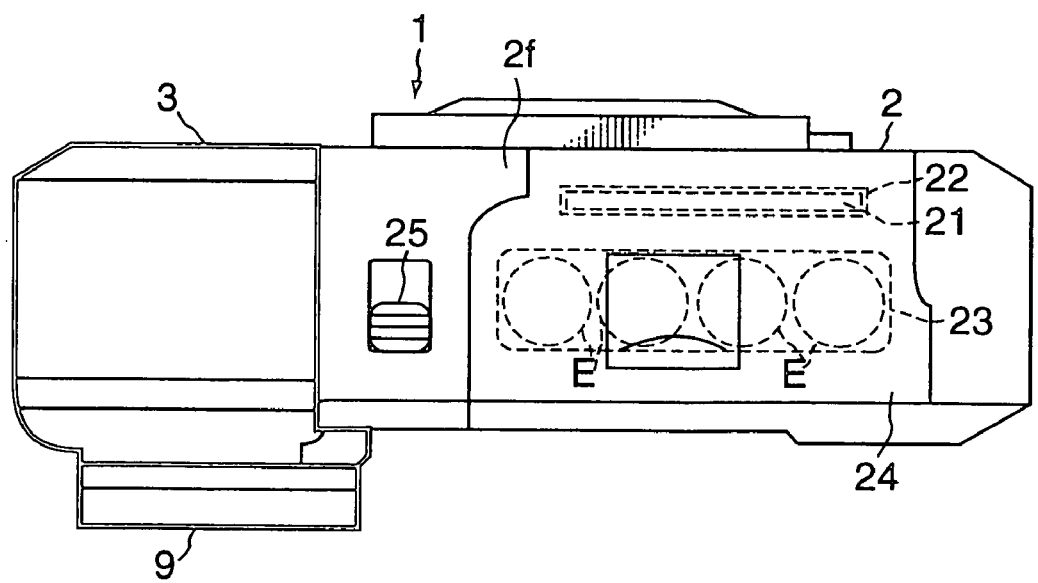
FIG. 4 is a bottom view of the digital camera.

FIG. 1 is a front view of a digital camera which is the embodiment of the present invention, FIG. 2 is a rear view of the digital camera, FIG. 3 is a right side view of the digital camera, and FIG. 4 is a bottom view of the digital camera.

As can be seen from the figures, the digital camera 1 is configured by a box-shaped camera body 2 and an image pickup unit 3. The image pickup unit 3 is illustrated by a thick line in FIGS. 1, 2 and 4. The image pickup unit 3 is detachably coupled at left side face 2d of the camera body 2. A hook-shaped first coupler (not shown in the figure) is provided on a right side face 3a of the image pickup unit 3, and a second coupler (not shown in the figure) which is coupled with the first coupler is provided on the left side face 2d of the camera body 2. By coupling of the first coupler with the second coupler, the image pickup unit 3 is firmly mounted on the camera body 2.

A flash device 4 is disposed at upper center portion on a front face 2a of the camera body 2. A window 5 for IrDA (Infrared Data Association) wireless communication is provided at upper right portion on the front face 2a, through which infrared light serving as a carrier of the data communication is outputted. A shutter release switch 6 is provided in the vicinity of the left end on an upper face 2b of the camera body 2 in FIG. 1. Output terminals 7 for outputting video signals and an input terminals 8 through which DC electric power is supplied from an AC adapter power source (not shown in the figure) are provided on a left side face 2c of the camera body 2.

The shutter release switch 6 includes a first switch S1 and a second switch S2. The first switch S1 is turned on when the user touches his finger on the shutter release switch 6 or when the user pushes down the shutter release switch 6 by a predetermined depth. The second switch S2 is turned on when the user fully pushes down the shutter release switch 6.

A taking lens 9 such as a zoom lens with macro lens function is provided substantially at the center of the front face 3b of the image pickup unit 3. An objective window 10 of an optical viewfinder is provided at upper left position on the front face 3b with respect to the taking lens 9. A focusing window 11 of an automatic focusing module (hereinafter abbreviated as AF module) is provided at upper center on the front face 3b. The AF module for sensing a distance to an object from the camera is disposed behind the focusing window 11 (not shown in the figure). The AF module receives a light reflected from the object through the focusing window 11 and calculates a distance to the object by using an optical image of the object. As a method for calculating the distance to the object, it is possible to use not only a known phase contrast sensing method but also a known triangular surveying. Furthermore, as a method for sensing the light from the object, it is possible to use not only a known passive method for sensing natural light but also a known active method for positively irradiates an infrared light to the object.

A photo-sensor 12 is provided at upper right on the front face 3b. The photo-sensor 12 such as an SPC (Silicon Photo Cell) senses a reflected light of a flash light reflected from the object for controlling a quantity of flash light of the flash device 4.

A monitor display 13 such as an LCD (liquid Crystal Display) is provided substantially at the center on the rear face 2e of the camera body 2. The monitor display 13 displays not only a monitor image for serving as an electrical viewfinder but also a reproduced still picture image which is, for example, stored in a memory card. Furthermore, the monitor display 13 displays a menu of operations which can be executed by the digital camera 1. The monitor display 13 is driven by, for example, NTSC video signals.

A plurality of switches 14 are provided below the monitor display 13 for setting display condition, contents of the display, and so on of the monitor display 13. Brightness and contrast of the monitor display 13 can be adjusted by switching of the switches 14. Furthermore, the contents of the menu or the mode of the image displayed on the monitor display 13 can be changed or selected by switching of the switches 14. Furthermore, the digital camera 1 can output the video signals for satisfying one of NTSC system or PAL system. Thus, the user can select the system of the video signals in the menu displayed on the monitor display 13.

A first indicator such as an LED (Light Emitting Diode) LED1 for showing a condition of a main switch 16 and a second indicator LED2 for showing an access condition to a memory card 21 for storing image data are provided at lower right portion of the monitor display 13. The first indicator LED1 turns on for emitting a light when the main switch 16 is turned on. The second indicator LED2 turns on for emitting a light when the memory card 21 is accessed.

A longitudinally oblong sliding switch 15 for setting the mode of the digital camera 1 is provided along the right side of the monitor display 13. The sliding switch 15 has three positions corresponding to "image pickup mode", "reproducing mode" and "PC communication mode" of the digital camera 1. In the image pickup mode, the digital camera 1 takes an image. In the reproducing mode, the digital camera 1 reproduces an image on the monitor display 13 by using the image data recorded in the memory card 21 or outputs the image to another monitor display externally connected through the output terminals 7. In the PC communication mode, the digital camera 1 communicates the data with an external personal computer via the IrDA data communication system.

The main switch 16 is disposed below the sliding switch 15. The main switch 16 is a push switch. When the main switch 16 is pushed under ON state of the digital camera 1, the electric power source is turned off. Alternatively, when the main switch 16 is pushed under OFF state of the digital camera 1, the electric power source is turned on.

A quadruplet switch 17 is provided at upper right portion on the rear face 2e of the camera body 2. The quadruplet switch 17 is a multifunctional switch including four push switches Z1 to Z4. The switches Z1 and Z2 serve as zooming switch in the image pickup mode, and serve as selection switch for selecting an image to be reproduced from the images recorded in the memory card 21 in the reproducing mode. The switches Z3 and Z4 serve as setting switch of exposure compensation in the image pickup mode, and serve as setting switch of trimming ratio of the reproducing image in the reproducing mode.

An eyepiece 18 of the optical viewfinder is provided at upper portion of a rear face 3c of the image pickup unit 3. A macro switch 19 for changing the function of the taking lens 9 to a macro lens and a display switch 20 for switching on and off of the monitor display 13 are provided below the eyepiece 18. The switches 19 and 20 are respectively push switches. The function of the taking lens 9 is changed between the zoom lens and the macro lens when the macro switch 19 is pushed one by one. The display switch 20 is used for displaying an image not only on the monitor display 13 but also an external monitor display apparatus (not shown in the figure) connected to the output terminals 7 via a predetermined cable at the same time. Generally, when the external monitor display apparatus has been connected to the output terminals 7 by the cable or when the cable which is normally connected to the external monitor display is coupled with the output terminals 7, the image is selectively displayed on the external monitor display apparatus but is not displayed on the monitor display 13. However, the display of the image is displayed on and off the monitor display 13 when the monitor display switch 20 is pushed one by one.

As shown in FIG. 4, a memory card recorder 22 to which the memory card 21 is inserted and a battery cavity 23 to which the batteries E and E' are filled are provided substantially at the center of the bottom of the camera body 2. A clamshell type lid 24 is hinged at a bottom face 2f of the camera body 2 for covering the memory card recorder 22 and the battery cavity 23. As the batteries E and E', for example, serially connected four AA size batteries are used.

A lock release lever 25 for detaching the image pickup unit 3 from the camera body 2 is provided in the vicinity of the left end on the bottom face 2f of the camera body 2. When the lock release lever 25 is slid, the above-mentioned first and second couplers coupling the image pickup unit 3 and the camera body 2 is decoupled, so that the image pickup unit 3 can be detached from the camera body 2.

Figure 5:
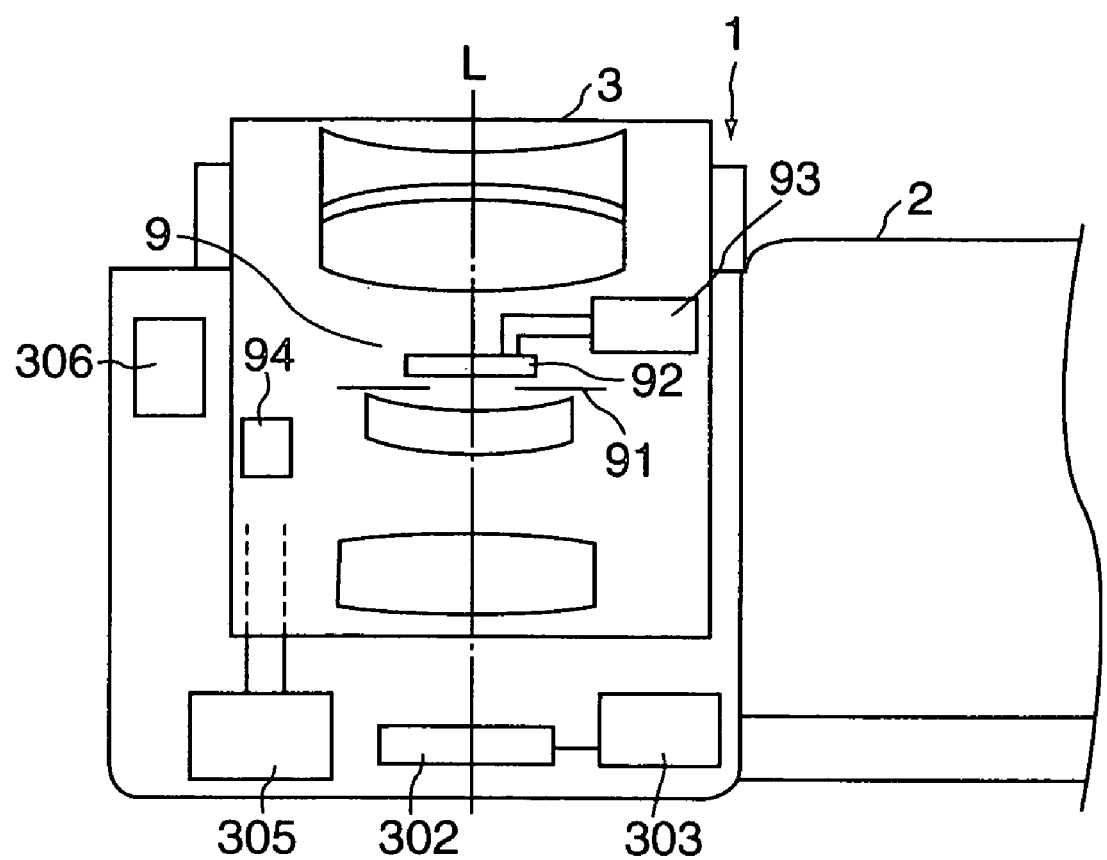
FIG. 5 is a schematic cross-sectional view showing an inside configuration of an image pickup unit 3 of the digital camera.

Internal configuration of the image pickup unit 3 is shown in FIG. 5. As mentioned above, the taking lens 9 is the zoom lens with macro lens function. An aperture diaphragm 91 and an ND filter 92 are provided in an optical lens system of the taking lens 9. The taking lens 9 comprises, for example, two moving lens components called compensator lens and variater lens. The compensator lens is configured by a plurality of lens elements and has a function for focusing an image of an object on a predetermined plane such as a photo-sensing plane of an image pickup device such as CCD. The variater lens is configured by a plurality of lens elements and has a function for changing the focal length of the taking lens 9.

The aperture diaphragm 91 comprises a plurality of thin blades overlapping each other. The aperture diaphragm 91 can take a plurality of steps of aperture numbers (F-number) respectively having different effective diameter corresponding to the overlapping condition of the blades. The largest F-number (the smallest diameter) of the aperture diaphragm 91 is decided so as not to occur the diffraction.

The ND filter 92 is driven by a plunger 93 in a direction perpendicular to an optical axis L of the optical lens system, and is selectively inserted into an optical path of the optical lens system of the taking lens 9. Positions of the aperture diaphragm 91 and the ND filter 92 are not restricted, but are disposed between the compensator lens and the variater lens consisting the zoom lens in this embodiment.

An AF motor 305 drives the compensator lens of the taking lens 9 for automatically focusing an image of an object on a predetermined focal plane. A zooming motor 306 drives the variater lens of the taking lens 9 for varying the focal length of the taking lens 9. An image pickup device 302 such as a color area sensor of the CCD is disposed on the optical path of the optical lens system of the taking lens 9. The center of the image pickup device 302 coincides with the optical axis L of the taking lens 9. The image pickup device 302 is connected to a signal processing circuit 303. Details of the signal processing circuit 303 will be described below. A position sensor 94 for detecting the position of the compensator lens of the taking lens is provided in the vicinity of the taking lens 9.

Figure 6:
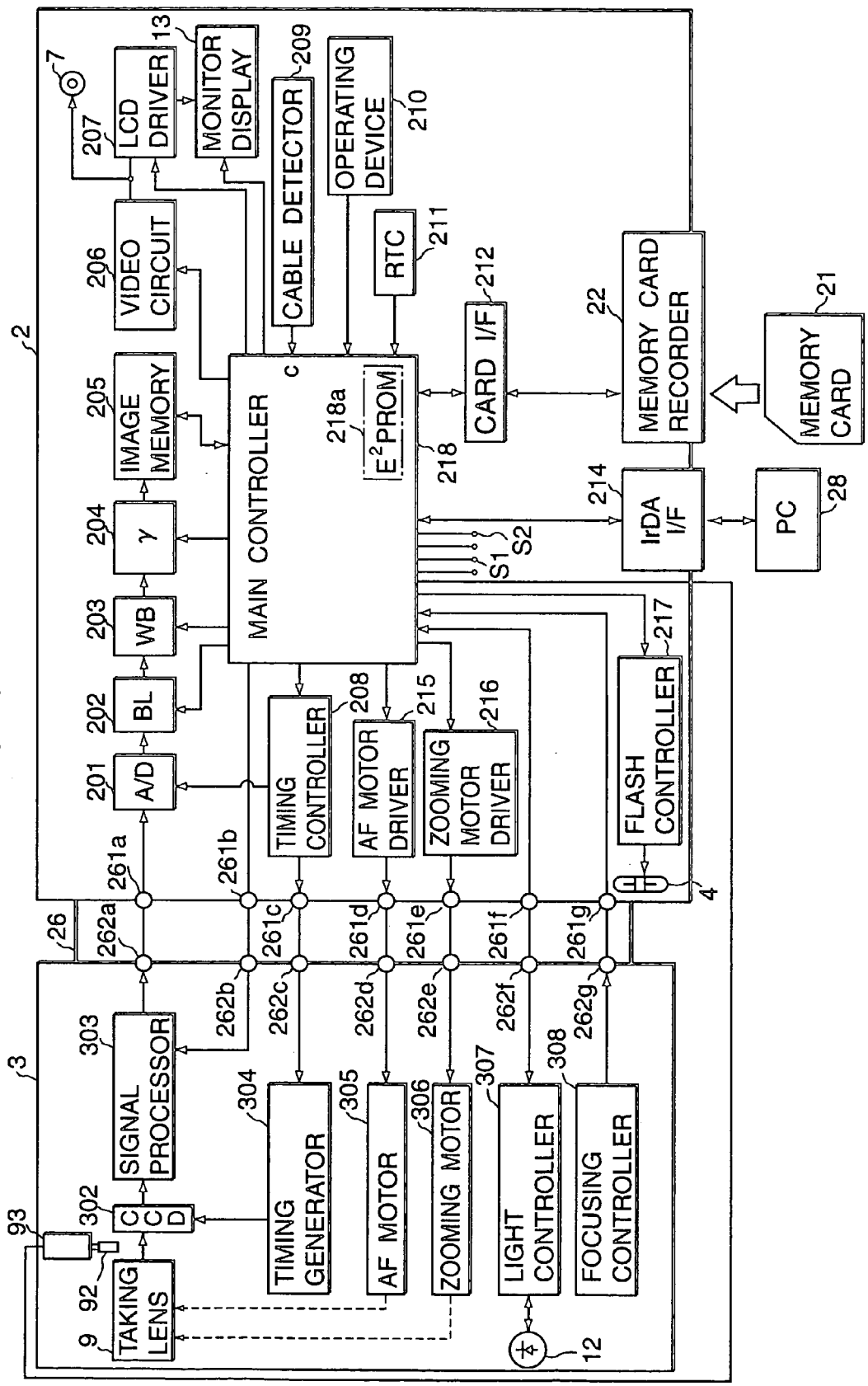
FIG. 6 is a block diagram showing a configuration of the digital camera.

A block diagram of the digital camera 1 of this embodiment is shown in FIG. 6. In FIG. 6, the image pickup unit 3 is assumed to be electrically connected with the camera body 2 by a connector 26.

The connector 26 corresponds to a connector provided on the camera body 2 and the image pickup unit 3. Terminals 261a to 261g correspond to the terminals of the connector on the camera body 2, and terminals 262a to 262g correspond to the terminals of the connector of the image pickup unit 3.

A timing generator 304, a light controller 307 and a focusing controller 308 are provided inside the image pickup unit 3 further to the above-mentioned taking lens 9, the image pickup device 302, the signal processor 303, the AF motor 305 and the zooming motor 306.

The image pickup device 302 photo-electrically converts an optical energy of an image focused on a surface thereof by the taking lens 9 to image signals with respect to each color of R, G and B, and it outputs the image signals. The image signals are serial analogue signals of electric charge stored in pixels of the image pickup device 302.

The signal processor 303 executes predetermined analog signal processes to the image signals outputted from the image pickup device 302. The signal processor 303 comprises CDS (Correlation Dual Sampling) circuit and AGC (Automatic Gain Control) circuit. The CDS circuit reduces the noise contained in the image signals. The AGC circuit adjusts the level of the image signals by adjusting the gain. The signal processor 303 is driven by control signals inputted through the terminals 261b and 262b from the main controller 218 provided in the camera body 2. The image signals from the signal processor 303 are inputted to an A/D converter 201 provided in the camera body 2 through the terminals 261a and 262a.

The timing generator 304 generates a plurality of kinds of driving control signals of the image pickup device 302 by using standard clock signals inputted through the terminals 261c and 262c from a timing controller 208 provided in the camera body 2. The timing generator 304 generates timing signals for start and finish the charge storage (exposure) of the image pickup device 302 and a plurality of kinds of clock signals such as horizontal synchronizing signal, vertical synchronizing signal, transfer signal, and so on for outputting electric charge in each pixel of the image pickup device 302. The timing signals and the clock signals are inputted to the image pickup device 302.

The AF motor 305 is driven by driving control signals inputted through the terminals 261d and 262d from an AF motor driver 215 provided in the camera body 2. The zooming motor 306 is driven by driving control signals inputted through the terminals 261e and 262e from a zooming motor driver 216 provided in the camera body 2.

The light controller 307 controls a quantity of flash light emitted from the flash device 4 to a predetermined quantity which is inputted through the terminals 261f and 262f from the main controller 218. In flash lighting image pickup operation, reflected light of the flash light from an object is received by the photo-sensor 12 at the same time of starting the exposure of the image pickup device 302. When the quantity of the reflected light received by the photo-sensor 12 reaches to the predetermined quantity, the light controller 307 outputs a stop signal for stopping the flash lighting through the terminals 261f and 262f, and the main controller 218 to a flash controller 217 provided in the camera body 2. When the stop signal is inputted, the flash controller 217 forcibly stops the flash lighting of the flash device 4. Thereby, the quantity of flash light of the flash device 4 is controlled.

The focusing controller 308 corresponds to the above-mentioned AF module for sensing a distance to an object. A distance information calculated by the focusing controller 308 is inputted through the terminals 261g and 262g to the main controller 218.

A black level compensation circuit (BL) 202, a white balance circuit (WB) 203, a γ compensation circuit (γ) 204, an image memory 205, a video signal output circuit (VIDEO CIRCUIT) 206, an LCD driver 207, a cable detector 209, an operating device 210, a real time circuit (RTC) 211, and an IrDA interface (IrDA I/F) 214 are provided inside the camera body 2 further to the A/D converter 201, the timing controller 208, the AF motor driver 215, the zooming motor driver 216, the flash controller 217 and the main controller 218.

The A/D converter 201 converts each analogue pixel signal corresponding to the electric charge in the image signals to ten-bits digital signals. The A/D converter 201 converts the analogue pixel signals to the digital signals corresponding to clock signals for A/D conversion inputted from the timing controller 208.

The black level compensation circuit (BL) 202 compensates the level of black of the converted digital image signals (hereinafter abbreviated as pixel data) to a predetermined standard level. The white balance circuit (WB) 203 adjusts the white balance of the image taken by the image pickup device 302. The white balance circuit 203 converts the levels of the pixel data with respect to color components of R, G and B by using a predetermined level conversion table inputted from the main controller 218. Coefficients in the level conversion table with respect to each color component is set by the main controller 218 in each image pickup operation.

The γ compensation circuit 204 compensates the γ characteristics of the pixel data by using a predetermined γ compensation table. The image memory 205 stores the pixel data outputted from the γ compensation circuit 204. The image memory 205 has a capacity sufficient to store the pixel data of one frame. For example, when the image pickup device 302 has the pixels arranged as a matrix of m×n, the image memory 205 has the capacity for m×n number of pixel data. Each pixel data is stored at a memory position having the same address as the position of the pixel.

The video signal outputting circuit 206 converts the image signals with respect to the color components of R, G and B to video signals satisfying the NTSC system or the PAL system and outputs the converted video signals to the LCD driver 207 and the output terminals 7. The LCD driver 207 drives the monitor display 13. In this embodiment, the LCD driver 207 drives the monitor display 13 by using the NTSC video signals. Alternatively, it is preferable that the LCD driver 207 should drive the monitor display 13 by using the PAL video signals. The type of the video signals converted by the video signal output circuit 206 is automatically set by the main controller 218 corresponding to the selection by the user.

When the monitor display 13 is used as the electric viewfinder, the monitor display 13 is driven by the NTSC video signals, so that the video signal output circuit 206 is set for converting the image signals to the NTSC video signals.

In a waiting state for image pickup operation, the image data for monitor display (live view image) is taken by the image pickup device 302 at interval of 1/30 second. The pixel data of the live view image are processed the predetermined signal processes by the A/D converter 201, the black level compensation circuit 202, the white balance circuit 203 and the γ compensation circuit 204. After that, the processed pixel data are stored in the image memory 205 and transmitted to the video signal output circuit 206 through the main controller 218. The pixel data are converted to the NTSC video signals by the video signal output circuit 206 and outputted to the LCD driver 207. The monitor display 13 is driven by the LCD driver 207 using the NTSC video signals, so that the image of the object is displayed on the monitor display 13. The user can be observed the object by the image displayed on the monitor display 13.

In the reproducing mode, the main controller 218 executes predetermined processes such as expansion of the image data to image data read out from the memory card 21. After that, the processed image data are transmitted to the video signal output circuit 206. The image data is converted to the NTSC video signals by the video signal output circuit 206 and outputted to the LCD driver 207. The image recorded in the memory card 21 is reproduced on the monitor display 13.

The timing controller 208 generates clocks for the timing generator 304 and another clocks for the A/D converter 201. The timing generator 208 is driven by the main controller 218. The cable detector 209 detects whether the cable for connecting the external monitor display is connected to the output terminals 7 or not. As an example of the cable detector 209, one of the output terminals 7 is used as a detector to which a male connector of the cable is inserted. The terminal serving as the detector is connected to a terminal "c" of the main controller 218 and a driving voltage is applied there to. Furthermore, a grounding switch for grounding the terminal "c" is provided to the terminal serving as the detector. When a terminal of a connector of the cable is connected, the grounding switch is turned on and the terminal "c" is grounded, so that the potential of the terminal "c" changes to a low level from a high level. Thus, the main controller 218 can detect whether the cable is connected or not.

The operating device 210 corresponds to an operation switch such as the shutter release switch 6, the switches 14, and so on. The real time circuit (RTC) 211 is an independent timer circuit for administrating the date or the time when the image is picked up taken by the digital camera 1. The real time circuit 211 is driven by a special backup battery which is independent from the battery E and E' shown in FIG. 4.

A card interface (I/F) 212 is an inter face for writing the pixel data in the memory card 21 and for reading the pixel data from the memory card 21 which is inserted into a card slot of the memory card recorder 22. The IrDA interface (I/F) 214 is an interface for communicating the data between the digital camera 1 and the personal computer (PC) 28 by infrared ray corresponding to the IrDA standard.

The AF motor driver 215 generates control signals for controlling the AF motor 305 and out puts the control signals through the terminals 261*d* and 262*d* to the AF motor 305. The zooming motor driver 216 generates control signals for controlling the zooming motor 306 and out puts the control signals through the terminals 261*e* and 262*e* to the zooming motor 306. The flash controller 217 controls whether the flash device 4 is used for irradiating the flash light or not corresponding to the control signal from the main controller 218, at first. When the flash device 4 is used, the flash controller 217 controls the timing of start of the irradiation of the flash light corresponding to control signals from the main controller 218, and controls the timing of stop of the irradiation of the flash light corresponding to the stop signal from the light controller 307 in the image pickup unit 3. Thus, the quantity of the flash light by the flash device 4 can be controlled to be a predetermined quantity.

The main controller 218 comprises a microprocessor for concentratively controlling the image pickup operation of the digital camera 1 by controlling the elements in the camera body 2 and the image pickup unit 3. The main controller 218 serves as a luminance judging portion and a shutter speed setting portion for setting an exposure time (corresponding to the shutter speed) of the image pickup device 302. When the main controller 218 serves as the luminance judging portion, it judges a luminance of an object by using a monitor image taken by the image pickup device 302 at interval of 1/30 second. When the main controller 218 serves as the shutter speed setting portion, it sets the charge storage time of the image pickup device 302 corresponding to the luminance of the object.

The main controller 218 further serves as a recording data forming portion. When the main controller 218 serves as the recording data forming portion, it reads the pixel data from the image memory 205 and forms a thumbnail image data and a compressed image data which are to be recorded in the memory card 21. For example, the recording data forming portion (the main controller 218) reads out the pixel data at an interval of eight pixels in the horizontal direction and at an interval of eight lines in the vertical direction along the raster scanning way from the data stored in the image memory 205, and serially transmits to the memory card 21. As a result, the thumbnail image data is formed and recorded in the memory card 21. Furthermore, the recording data forming portion reads out all the pixel data from the image memory 205 and processes two-dimensional DCT conversion and data compression by JPEG (Joint Photographic Coding Experts Group) such as Huffman cording to the pixel data for forming an image data compressed by a predetermined compression ratio, and it memorizes the image data in the memory card 21. As a result, a compressed image data is formed and recorded in the memory card 21.

The main controller 218 still further serves as a reproducing image forming portion. When the main controller 218 serves as the reproducing image forming portion, it reads out a compressed image data from the memory card 21 and processes a predetermined expansion operation for forming a reproducing image data which is to be displayed on the monitor display 13 from an image data recorded in the memory card 21. The reproducing image data is outputted to the video signal output circuit 206.

Figure 7:
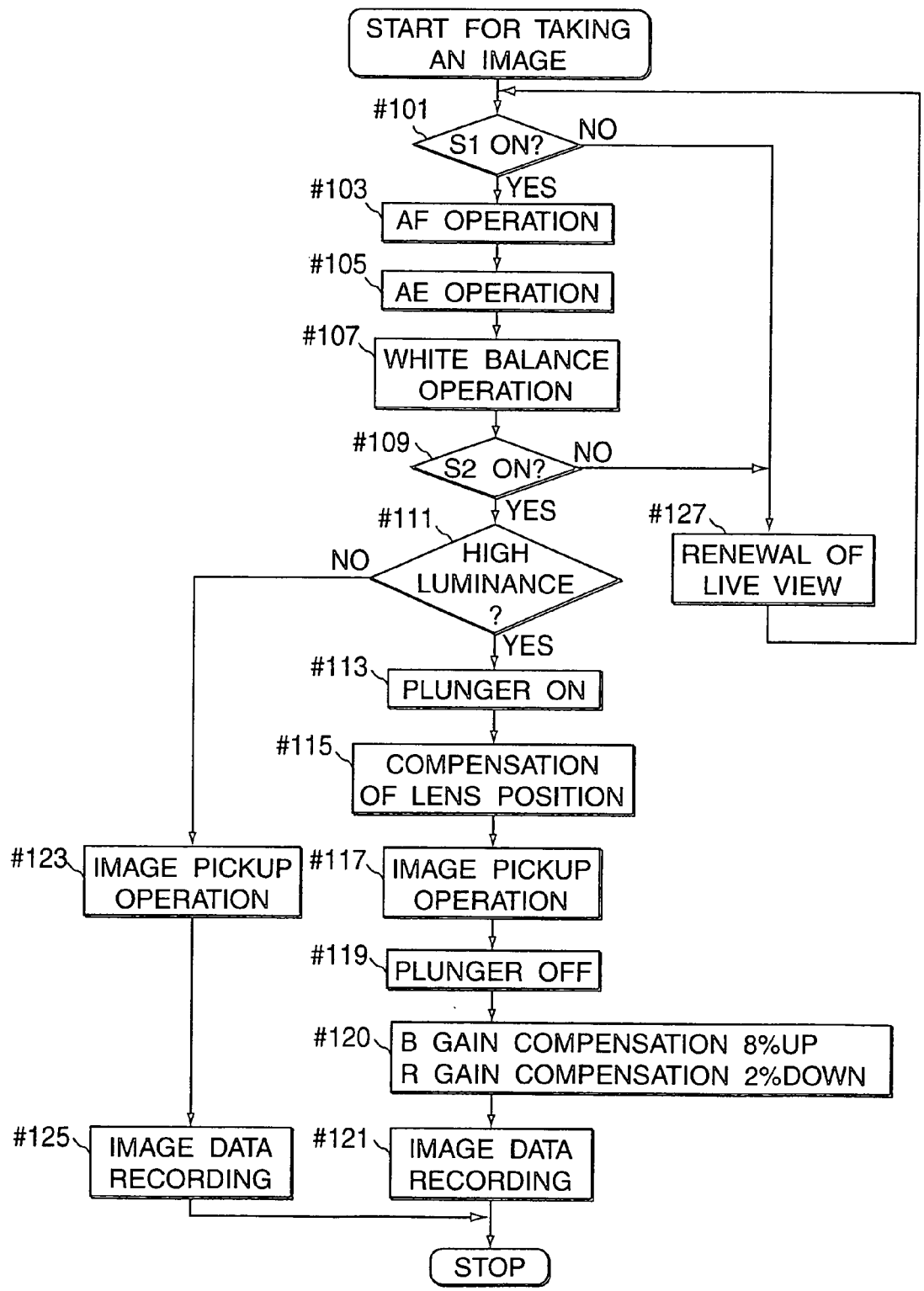
FIG. 7 is a flowchart showing an operation of the digital camera.

Operations of the digital camera in accordance with this embodiment from the waiting mode after switching on of the main switch is described referring to a flowchart shown in FIG. 7.

Generally, in the waiting state only when the main switch is turned on of the digital camera 1, an image of an object is focused on the image pickup device 302 by the taking lens 9, and the image (live view image) taken by the image pickup device 302 and displayed on the monitor display 13 is renewed at intervals of 1/30 sec (Step #127). Under this condition, the main controller 218 judges whether the first switch S1 provided in the shutter release switch 6 is turned on or not, that is the user wishes to take an image or not (Step #101). When the first switch S1 is turned on (YES in Step #101), the main controller 218 controls the AF motor 305 via the AF motor driver 215 for focusing the taking lens 9 (AF operation: Step #103). In parallel with the AF operation, the main controller 218 senses a luminance of the image from the image signals from the image pickup device 302 (AE operation: Step #105).

Subsequently, the main controller 218 executes the white balance operation to the image signals of color components of R, G and B from the image pickup device 302 (Step #107). In the white balance operation in this embodiment, the white balance circuit (WB) 203 adjusts the amplification gains (hereinafter abbreviated as R gain and B gain) for the image signals of the color components of R and B in a manner so that a total quantity of electric charges of the image signals of the color component of R and a total quantity of electric charges of the image signals of the color component of B respectively become equal to a total quantity of electric charges of the image signals of the color component of G.

The position of the taking lens 9 when the image of the object is focused on the image pickup device 302 in Step #103, the luminance of the object in Step #105 and the R gain and the B gain in Step #107 are temporarily stored in an internal memory 218a such as E²PROM of the main controller 218.

Subsequently, the main controller 218 judges whether the second switch S2 is turned on or not (Step #109). When the second switch S2 is turned on (YES in Step #109), the main controller 218 judges whether the luminance of the object obtained in Step #105 is larger than a predetermined value (high luminance) or not (Step #111). The predetermined value of the luminance (BV) corresponds to a value when the F-number (AV) of the aperture diaphragm 91 is set to be the largest value and the charge storage time of the image pickup device 302 which corresponds to the shutter speed (TV) is set to be the shortest time. Thus, when the luminance of the object is higher than the predetermined value, the charge in each pixel of the image pickup device 302 will be overflowed. As mentioned above, the aperture diaphragm 91 cannot take larger F-number such as F11 and F16 in the still camera using the silver-salt film for preventing the reduction of the quality of the image due to the diffraction.

When the luminance of the object is higher than the predetermined value (YES in Step #111), the main controller 218 drives the plunger 93 for inserting the ND filter 92 in the optical path of the optical lens system of the taking lens 9 (Plunger On: Step #113). In parallel with the insertion of the ND filter 92, the main controller 218 drives the AF motor 305 for moving the position of the taking lens 9, especially the position of the compensator lens in order to compensate the movement of the focal plane due to the insertion of the ND filter 92 (Step #115). Since the configuration of the optical lens system of the taking lens 9 and the thickness, the index of a material and the position of the insertion of the ND filter 92 are known, the moving quantity of the focal plane or the position of the taking lens 9 to be moved can be calculated.

Figure 8:
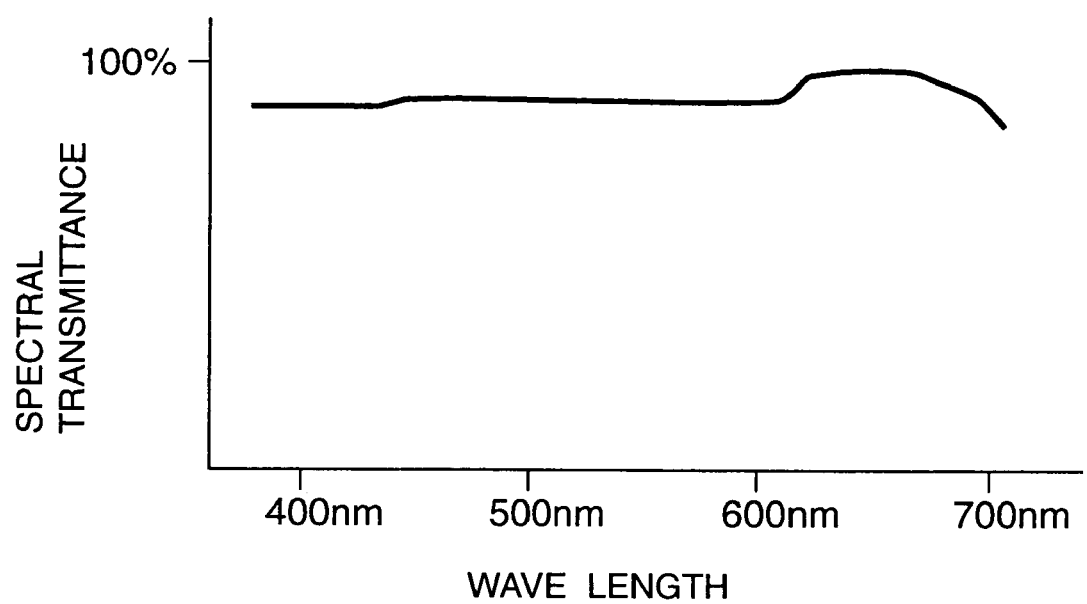
FIG. 8 is a graph showing an example of a characteristic of spectral transmittance of an ND filter.

When the position of the taking lens 9 is compensated, the main controller 218 drives the image pickup device 302 for taking an image of the object (Image Pickup Operation: Step #117). When the image pickup operation is completed, the main controller 218 drives the plunger 93 for removing the ND filter 92 from the optical path of the optical lens system of the taking lens 9 (Plunger Off: Step #119). Furthermore, the main controller 218 compensates the R gain and the B gain for amplifying the image signals of the color components of R, G and B from the image pickup device 302 in order to compensate the imbalance of the white balance due to the insertion of the ND filter 92 (Step #120). After that, the main controller 218 records the image data in the memory card 21 (Step #121). In this embodiment, the spectral transmittance of the ND filter 92 is previously measured and the values of the R gain and the B gain in Step 107 are compensated. For example, when the ND filter 92 has the spectral transmittance shown in FIG. 8, the value of the B gain is increased by about 8%, and the value of the R gain is decreased by about 2%, so that the image can be prevented to be tinged with red. The compensation coefficients of the R gain and the B gain are stored, for example, in the internal memory 218a of the main controller 218.

When the luminance of the object is lower than the predetermined value (NO in Step #111), the main controller 218 selects the F-number of the aperture diaphragm 91 and the charge storage time of the image pickup device 302 for exposing the image pickup device 302 properly. After that, the main controller 218 drives the image pickup device 302 for taking an image of the object (Step #123). In this case, the ND filter 92 is not inserted into the optical path of the optical lens system of the taking lens 9, so that the compensation of the position of the taking lens 9 and the compensation of the white balance are not executed. The image signals of the color components of R, G and B taken by the image pickup device 302 are recorded in the memory card 21 after predetermined processes (Step #125).

As mentioned above, the digital camera 1 of this embodiment inserts the ND filter 92 into the optical path of the optical lens system of the taking lens 9 after the second switch S2 is turned on when the shutter release switch 6 is fully pushed down, so that the time period for supplying the electric power to the plunger 93 becomes much shorter. Thus, the consumption of the battery can be minimized. The defocus quantity of the taking lens 9 and the imbalance of the white balance due to the insertion of the ND filter 92 can be calculated or measured previously, so that the position of the taking lens 9 and the white balance can be compensated by previously calculated or measured compensation factors without adjusting the focus of the taking lens and measuring the white balance after inserting the ND filter 92. As a result, the time lag between when the used pushes down the shutter release switch 6 to when the image is taken by the image pickup device 302 is not to be so long.

In the above-mentioned embodiment, the diameter of the aperture diaphragm 91 is movable. However, it is possible to fix the diameter of the aperture diaphragm 91 and to control the quantity of light exposing the image pickup device 302 by inserting and removing of the ND filter 92 and varying the charge storage time of the image pickup device 302. Furthermore, it is possible to use a plurality of the ND filters. When two or more ND filters are used, it is possible to vary the density of each ND filter.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image pickup apparatus comprising:
an optical lens system;
a luminance sensor for sensing a luminance of an object;
a judging device for judging whether the luminance of the object is higher than a predetermined value or not;
a neutral density filter to be inserted into an optical path of the optical lens system;
a driver for inserting the neutral density filter into the optical path when the luminance of the object is higher than the predetermined value; and
a compensator for compensating position of a focal plane of the optical lens system after insertion of the neutral density filter.

2. The image pickup apparatus in accordance with claim 1 further comprising an instruction member for instructing start of image pickup operation, and wherein the driver inserts the neutral density filter into the optical path before the start of the image pickup operation and after the instruction by the movement of the instruction member.

3. The image pickup apparatus in accordance with claim 1, wherein the driver removes the neutral density filter from the optical path after completing the image pickup operation.

4. The image pickup apparatus in accordance with claim 1, wherein the compensator compensates the position of the focal plane of the optical lens system which is focused before the insertion of the neutral density filter.

5. The image pickup apparatus in accordance with claim 1, wherein the compensator compensates the position of the focal plane of the optical lens system corresponding to a defocus quantity due to the insertion of the neutral density filter which is previously calculated.

6. A method for compensating position of focal plane of an optical lens system used in an image pickup apparatus comprising steps of:
sensing a luminance of an object;
judging whether the luminance of the object is higher than a predetermined value or not;
inserting a neutral density filter into an optical path of an optical lens system when the luminance of the object is higher than the predetermined value; and
compensating position of focal plane of the optical lens system after inserting the neutral density filter into the optical path.

7. An image pickup apparatus comprising:
an image pickup device;
an optical lens system;
a luminance sensor for sensing a luminance of an object;
a judging device for judging whether the luminance of the object is higher than a predetermined value or not;
a neutral density filter to be inserted into an optical path of the optical lens system;
a driver for inserting the neutral density filter into the optical path when the luminance of the object is higher than the predetermined value;
a first compensator for compensating output signals from the image pickup device after insertion of the neutral density filter; and
a second compensator for compensating position of a focal plane of the optical lens system after insertion of the neutral density filter.

8. The image pickup apparatus in accordance with claim 7 further comprising an instruction member for instructing start of image pickup operation, and wherein the driver inserts the neutral density filter into the optical path before the start of the image pickup operation and after the instruction by the movement of the instruction member.

9. The image pickup apparatus in accordance with claim 7, wherein the driver removes the neutral density filter from the optical path after completing the image pickup operation.

10. The image pickup apparatus in accordance with claim 7, wherein the first compensator compensates white balance of the output signals from the image pickup device which is previously adjusted before the insertion of the neutral density filter, and the second compensator compensates the position of the focal plane of the optical lens system which is focused before the insertion of the neutral density filter.

11. The image pickup apparatus in accordance with claim 10, wherein the first compensator compensates the white balance corresponding to spectral transmittance of the neutral density filter which is previously measured, and the second compensator compensates the position of the focal plane of the optical lens system corresponding to a defocus quantity due to the insertion of the neutral density filter which is previously calculated.

* * * * *